United States Patent
Baetens

(10) Patent No.: US 11,069,046 B2
(45) Date of Patent: Jul. 20, 2021

(54) EFFICIENT SMOKE DETECTION BASED ON VIDEO DATA PROCESSING

(71) Applicant: Araani BVBA, Kortrijk (BE)

(72) Inventor: Maggy Baetens, Kortrijk (BE)

(73) Assignee: Araani BVBA, Kortrijk (BE)

( * ) Notice: Subject to any disclaimer, the term of this patent is extended or adjusted under 35 U.S.C. 154(b) by 0 days.

(21) Appl. No.: 16/320,683

(22) PCT Filed: Jul. 28, 2017

(86) PCT No.: PCT/EP2017/069209
§ 371 (c)(1),
(2) Date: Jan. 25, 2019

(87) PCT Pub. No.: WO2018/020021
PCT Pub. Date: Feb. 1, 2018

(65) Prior Publication Data
US 2019/0164273 A1    May 30, 2019

(30) Foreign Application Priority Data

Jul. 28, 2016 (EP) .................................. 16181743
Nov. 14, 2016 (EP) .................................. 16198737

(51) Int. Cl.
*G06K 9/00* (2006.01)
*G06T 7/00* (2017.01)
(Continued)

(52) U.S. Cl.
CPC ........ *G06T 7/0002* (2013.01); *G06K 9/00711* (2013.01); *G06K 9/00771* (2013.01);
(Continued)

(58) Field of Classification Search
CPC ................... G08B 17/10; G08B 17/12; G06K 2009/00738; G06K 9/00711;
(Continued)

(56) References Cited

U.S. PATENT DOCUMENTS 4,614,968 A    9/1986  Rattman et al.
6,037,976 A *  3/2000  Wixson .............. G06K 9/00785
                                                    348/122

(Continued)

FOREIGN PATENT DOCUMENTS

WO    00/23959       4/2000
WO    2009/136894 A1  11/2009

OTHER PUBLICATIONS

Turgay Celik, et al., Fire and Smoke Detection Without Sensors: Image Processing Based Approach, 15th European Signal Processing Conference, Sep. 3-7, 2007, pp. 1-5, Poznan, Poland.

(Continued)

*Primary Examiner* — Ian L Lemieux
(74) *Attorney, Agent, or Firm* — Dinsmore & Shohl, LLP

(57) ABSTRACT

The invention relates to methods and systems of detection of smoke or the like in an environment, such as a closed room but not limited thereto, based on video data processing of video data captured in said environment, and wherein the video data processing is for example executed on a computation system.

10 Claims, 12 Drawing Sheets

(51) Int. Cl.
    *G06T 7/246* (2017.01)
    *G08B 17/10* (2006.01)
(52) U.S. Cl.
    CPC ............ *G06T 7/246* (2017.01); *G08B 17/10*
        (2013.01); *G06K 2009/00738* (2013.01); *G06T*
        *2207/10016* (2013.01)
(58) Field of Classification Search
    CPC ...... G06K 9/00771; G06T 2207/10016; G06T
        7/0002; G06T 7/246
    See application file for complete search history.

(56) References Cited

U.S. PATENT DOCUMENTS

| | | | | |
|---|---|---|---|---|
| 7,379,592 B2* | 5/2008 | Miller | ...................... | G01W 1/00 |
| | | | | 382/173 |
| 2005/0069207 A1* | 3/2005 | Zakrzewski | ........... | G06K 9/629 |
| | | | | 382/190 |
| 2005/0162516 A1* | 7/2005 | Loepfe | ...................... | G06T 7/44 |
| | | | | 348/156 |
| 2011/0051993 A1* | 3/2011 | Caballero | ............ | G08B 13/196 |
| | | | | 382/100 |
| 2013/0342692 A1* | 12/2013 | Li | ............................ | G06T 7/00 |
| | | | | 348/143 |
| 2015/0213698 A1* | 7/2015 | Peters | .................... | G08B 17/10 |
| | | | | 348/143 |
| 2016/0104295 A1* | 4/2016 | Papillon | .................. | G06T 7/246 |
| | | | | 382/103 |
| 2016/0253888 A1* | 9/2016 | Stadler | ................. | G08B 17/125 |
| | | | | 348/143 |

OTHER PUBLICATIONS

International Search Report and Written Opinion pertaining to International Application No. PCT/EP2017/069209 14 pages.

* cited by examiner

EFFICIENT SMOKE DETECTION BASED ON VIDEO DATA PROCESSING

The present disclosure is a national stage entry of and claims priority to International App. No. PCT/EP2017/069209, filed Jul. 28, 2017, and entitled "EFFICIENT SMOKE DETECTION BASED ON VIDEO DATA PROCESSING," which claims priority to EP App. No. 16181743.2, filed Jul. 28, 2016, and entitled "EFFICIENT SMOKE DETECTION BASED ON VIDEO DATA PROCESSING," and EP App. No. 16198737.5, filed Nov. 14, 2016, and entitled "EFFICIENT SMOKE DETECTION BASED ON VIDEO DATA PROCESSING," the entireties of which are incorporated by reference herein.

FIELD OF THE INVENTION

The invention relates to methods and systems of detection of smoke or the like in an environment, such as a closed room but not limited thereto, based on video data processing of video data captured in said environment, and wherein the video data processing is for example executed on a computation system.

BACKGROUND OF THE INVENTION

Various methods and systems of detection of smoke exist but are not sufficiently reliable due to the effect of occurring disturbances and their sensitivity thereto.

It is worth noting that many detection methods are based on determining motion in a scene and hence require image processing using at least images taken at a different time instance. However, such methods and systems are relatively computational demanding and imply heavy processing.

Furthermore, most detection methods are based on a hypothesis formulation on what is happening in the scene and especially for smoke formulation such hypothesis, in particular based on motion, is extremely difficult to generate, not very realistic in real environments which may have very dynamic fluid flows, and causes false alarms.

AIM OF THE INVENTION

The invention provides for reliable smoke detection methods and systems which are less computationally demanding and applicable for real life (industry) environments.

SUMMARY OF THE INVENTION

In a first aspect of the invention a method for detection of smoke in an environment is provided, comprising the steps of: capturing or streaming video data, comprising a plurality of image frames; determining a suitable metric for said plurality of image frames; computing and optionally storing corresponding value of said metric per image frame; and determining smoke in said environment by monitoring a representative change in said value of said metric across said plurality of image frames. In an embodiment, the determining of smoke is based on a reduction of said value of said metric, and may be for instance be taken relative to the so-called background contrast. This background contrast is defined as spread or smoothened immediate contrast values over a certain period of time, whereas the relative measure is then e.g. the relative difference between background contrast and immediate contrast. Alternatively, instead of smoke, other nebulous phenomena such as for instance dust or steam, can also be subject of the detection method in accordance with the invention. The metric itself can be interpreted as a kind of parameter relation that is self-defined or determined based upon physical phenomena and characteristics related to smoke and the detection thereof, whereas the value of the metric is referred to as the computation of such parameter relation. The metric as mentioned, of which changes are monitored in order to determine when smoke is indeed present, particularly referred to is contrast, however noise based on which the contrast is defined (besides grey-scale values), as well as motion and brightness can be considered. The environment wherein the detection method is applied in fact can be inside or outside as long as there is sufficient background contrast present in order to subtract something, i.e. to calculate a decrease in this background contrast, and whenever there is enough light (related thereto). Regarding type of images there are no real constraints, i.e. anything can be detected although too much noise, insufficient light or brightness will disturb the system. The larger the environmental area of the image to be captured, possibly the larger the distance of a potential smoke event to the camera, and hence the larger such smoke event has to be in order to become visible or to be detected by the system.

In a second aspect of the invention, given the central role of the metric, preparatory steps are taken to adapt the sensitivity of said metric for changes in said environment, in particular the lack of homogeneity of the environment (in essence of the images captured) is explicitly taken into account by adopting a per region basis in said metric determination or its value computation. In other words, the image captured is not considered as one homogeneous entity that is averaged, but specific regions within an image frame are determined to perform the detection. By means of these specific regions, particularly forming the edges or contours within a real image, local differences, changes or disturbances are taken into account, whereas in case of averaging a lot of valuable information gets lost. One of the parameters related to said metric determination and being adapted to optimize the sensitivity of the metric for changes in the environment, is for instance the amount of pixels being taken into account. Moreover, in a particular embodiment, the amount of pixels is based on the dominant wavelength in the energy spectrum.

In a third aspect of the invention, it is recognized that the concept of motion detection, when applied in a particular way, by disabling the use of the related pixel values, is useful, if such motion is related to rather fast motion (such as of vehicles or persons in the environment). The use of the motion detection at this level is not related to any hypothesis on the smoke nor does it require much extra computations as a rough computation is sufficient. In essence the smoke detection itself is not directly based on the motion detection as the metric value is computed on a per image basis. A step of motion detection being performed on the video data captured, is for example based on outlier analysis of the contrast data. Alternatively, such step of motion detection can be based on scene histogram data. According to an embodiment, the step of motion detection is based on combinations of both.

In a fourth aspect of the invention, instead of motion detection, local brightness changes are used for the same purpose as in the third aspect of the invention.

In a fifth aspect of the invention, a method for detection of fluidics (e.g. gas) leakage from a closed (pressurized) environment is provided, comprising the steps of: capturing thermal video data, comprising a plurality of image frames; computing at least one metric value per image frame;

determining nebulous phenomena by monitoring the change in said value of said metric across said plurality of image frames and based thereon detect of leakage of said fluidics from said closed (pressurized) environment. The nebulous phenomena as mentioned are for example resulting from a temperature drop occurring during expansion of said fluidics while leaking from said closed (pressurized) environment.

One or more of the above aspects can be combined.

DETAILED DESCRIPTION

Figure 1:
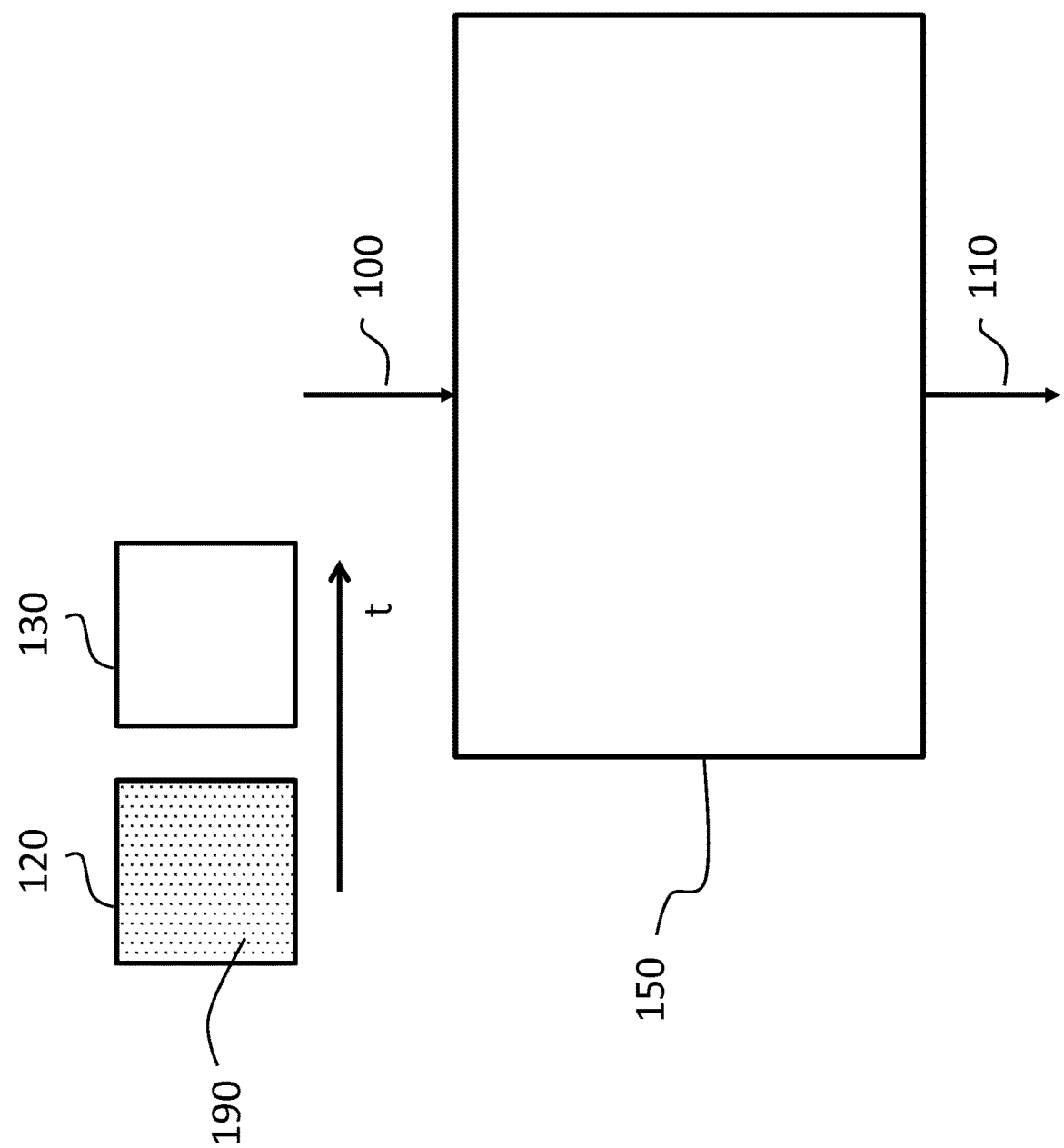
FIG. 1 provides a flowchart of the method in accordance with the invention.

The invented methods and systems of detection of smoke or the like in an environment based on video data processing of video data are operating a data set wherein for each time instance an image frame (covering the portion of the environment under surveillance) is available, and wherein such image frame comprises for each of a plurality of pixels a (discretized) (possibly greyscale/possibly color) value.

Recall the requirements of having methods and systems of detection of smoke which are sufficiently reliable and being computational efficient. While it is from a theoretical point of view, various methods may from a functional point of view be the same, when operating on ideal images, it is also well recognized that when working in real-life situations and hence operating on real images while being concerned about performance aspects, transformation of methods do have a huge effect in terms of computational performance (memory and computation unit use) and/or numerically.

The invented method avoids for the smoke detection the fine grained motion detection required by the state-of-the-art as it is operating on a metric value computed on an image, representative for the scene at a certain time instance and by looking at time variations only at metric level instead. Alternatively, instead of smoke detection, the method is also applicable in case of detecting another misty, blurry or nebulous phenomenon such as dust, fog or steam.

The methods and related systems in accordance with the present invention are particularly efficient, while being optimized in terms of processing. Complex calculations and difficult computations from the art are replaced by significantly simplified alternatives such that much less heavy processing is needed to achieve the necessary results. The method thus avoids complicated image transformations e.g. wavelet transforms, as the metric value computation is performed on the image captured directly on the scene. Hence, with the new method, a low CPU usage has become sufficient, as opposed to others known in the art representing a high-level CPU. Further, due to this low CPU usage much more simple, less sophisticated and less expensive hardware equipment can be used, as well it is possible to fairly reduce the number of components needed for the detection set-up. The invention relates to a method for detection of smoke in an environment, comprising the steps of: capturing video data, comprising a plurality of image frames; computing a value of metric per image frame; and determining smoke in said environment essentially only by monitoring the change in said value of said metric across said plurality of image frames. The smoke detection method is particularly focusing on contrast value measurements (as metric value computation) although possibly combined with smart metric value computation such as neglecting part of the scene in case of other detected phenomena than smoke, such as for instance motion and/or brightness changes.

Moreover, the methods and systems according to the invention are far better performing due to their robustness, particularly related to stability in usage, e.g. having best possible calibration and settings at all times and occasions, while flexibility or adaptability is provided for tuning this calibration or settings in an automated or either occasion forced manner. The stability of the system implies that the system is less sensitive for disturbances or local changes to be ignored as regard to smoke alarm. Moreover, the stable operating quality as secured by the robust methods and systems provided with the invention, induce that a very reliable detection mechanism is herewith delivered.

The invented methods and systems are based on spatial energy analysis using contrast, noise and dominant frequency or wavelength, being also common terminology in the field of wavelet transformations which are standard practice for detecting smoke, be it applied in the state of the art on the entire image as such. In accordance with the invention new use of such concepts is provided in order to accomplish a simplified algorithm and computations accordingly.

FIG. 1 illustrates with a flowchart the method in accordance with the invention, wherein based on image data 100 information 110, indicative for the presence of smoke, is determined in step 150. Typically said image data 100 comprises of a plurality of image frames 120, 130, consecutively organized in time. In an exemplary embodiment of the invention each of said image frames comprises of an array of pixels 190. Although here a rectangular grid is shown, the invention is not limited thereto. Also other grids like honeycomb structured can be used.

Figure 2:
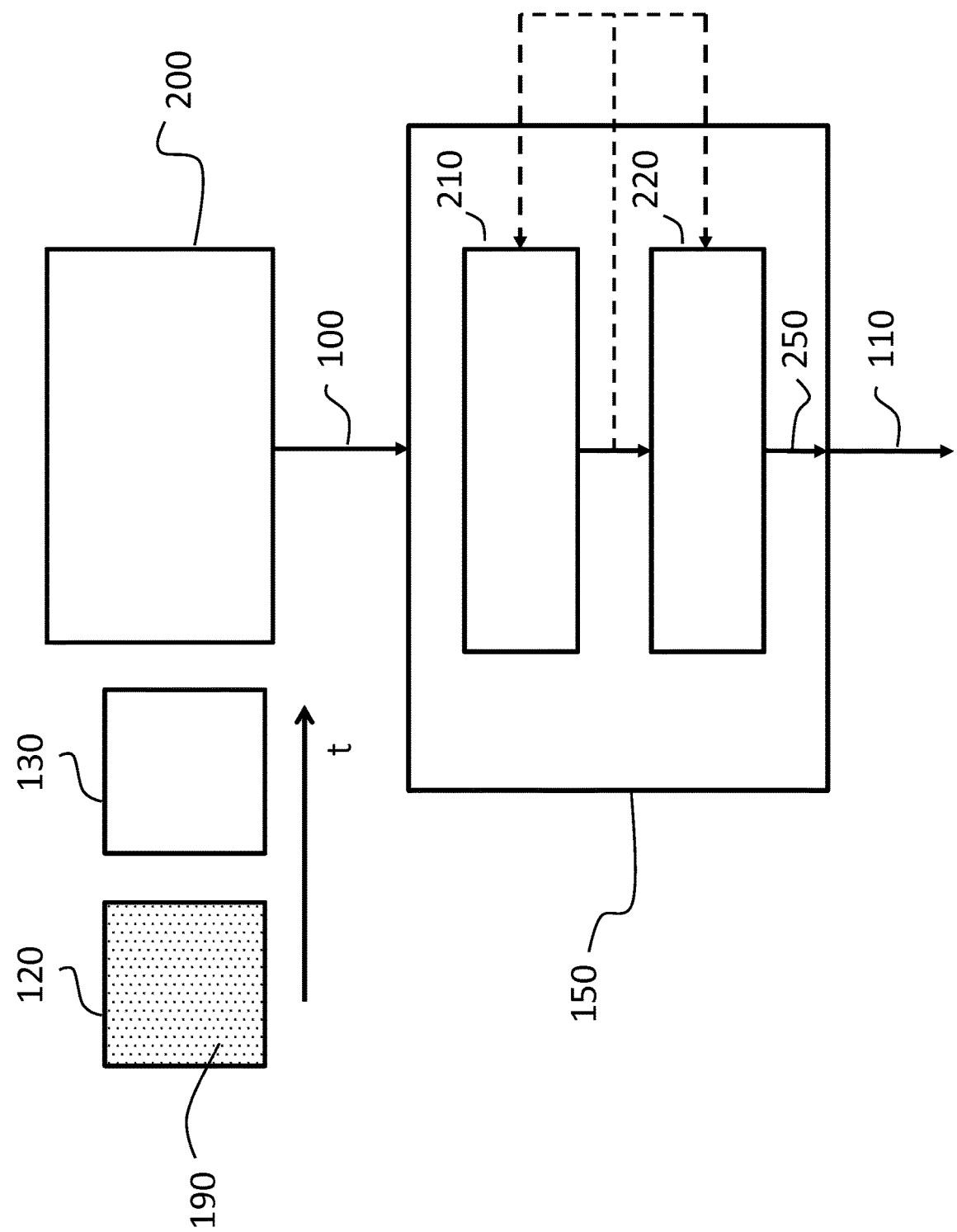
FIG. 2 illustrates a flowchart of an embodiment of the method in accordance with the invention.

FIG. 2 illustrates an embodiment of the flowchart of FIG. 1 in that the capturing of said image frames 120, 130, here denoted capturing of video data 100, as a first step 200 is explicitly indicated, whereas the video data 100 is then used for the smoke detecting process. Obviously the method can in principle be applied on recorded data but given that the purpose of the invention is particularly to detect smoke or another nebulous effect with possible potential danger in an environment, the method is typically applied in a more or less real-time fashion. According to an embodiment, video data located at a server is streamed with a possible delay instead of captured as mentioned above. The flowchart further indicates a step 210 operable on an image frame of video data 100, wherein at least one metric is determined and its corresponding value is calculated per image frame and thereafter a step 220 wherein the corresponding metric values across the image frames at different time instances are compared in order to determine a change in said metric value. The determined measure of change 250 in function of time lapsed is then used as representative signal for detection of smoke.

Figure 3:
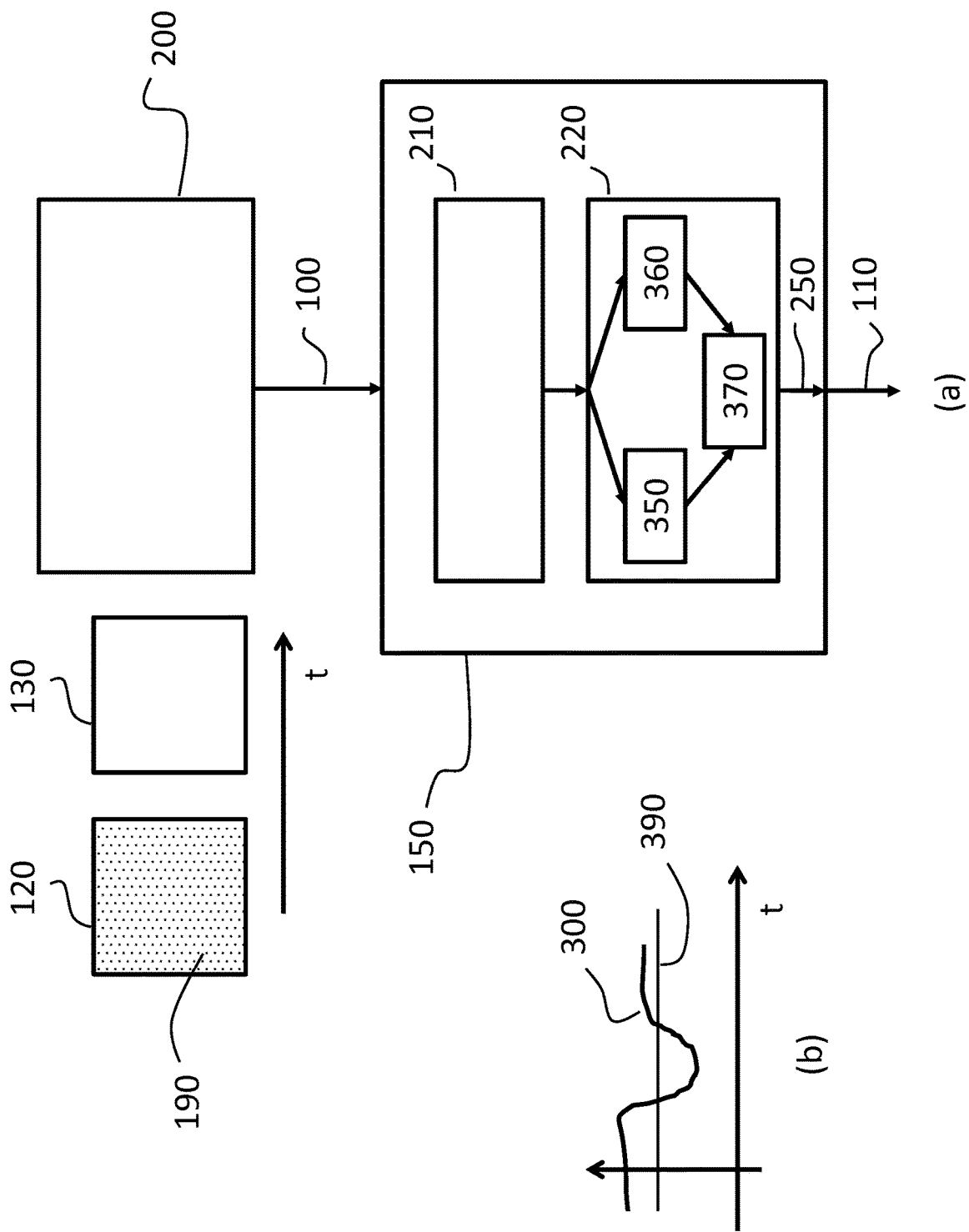
FIG. 3 presents a more detailed flowchart of an embodiment of the method in accordance with the invention.

FIG. 3 illustrates more details of the above described embodiment. In essence the temporal dynamics (hence along time) of the metric value 300 is illustrated in FIG. 3 (*b*). Note that here a continuous line is shown but in practice per time point for a corresponding place one metric value is available and hence the line is actually a concatenation of discrete value point. Further there is illustrated in FIG. 3 (*a*) that the decision step 370 may look at both absolute changes (computed in step 350) and relative changes (computed in step 360). In an exemplary embodiment the used metric is the local contrast, hence the contrast at a certain position in the image. Such contrast is determined by using nearby pixel values within the same image frame 120, 130. Preferably said metric value is normalized. As an image frame 120, 130 has info on a variety of positions in the monitored environment, in practice all the method steps are applied a plurality of times, in that in principle for all positions a metric (like contrast) can be determined, its corresponding value normalized and then further compared (in absolute and relative terms). Hence while the metric value computation is done on a place per place basis, the final smoke detection (related to a metric value change) is based on gathered information of a plurality of places or positions. Note that with an absolute change is meant that the metric value change is up or below a certain threshold 390 while with a relative change is meant that the relative difference of the metric value is compared with another threshold or value (not illustrated). These thresholds are parameters of the methods which can be selected to optimize the performance of the method. Various combinations of use of the absolute and relative change can be made. One can for instance first based on the absolute change, select the positions requiring further attention, and then based thereon, compute the relative change only for those positions indicated to need further consideration. Note that given the real-time character of the method and the fact that many positions must be computed, in principle almost parallel in time, the technical considerations regarding efficiency of computation are important.

Figure 6:
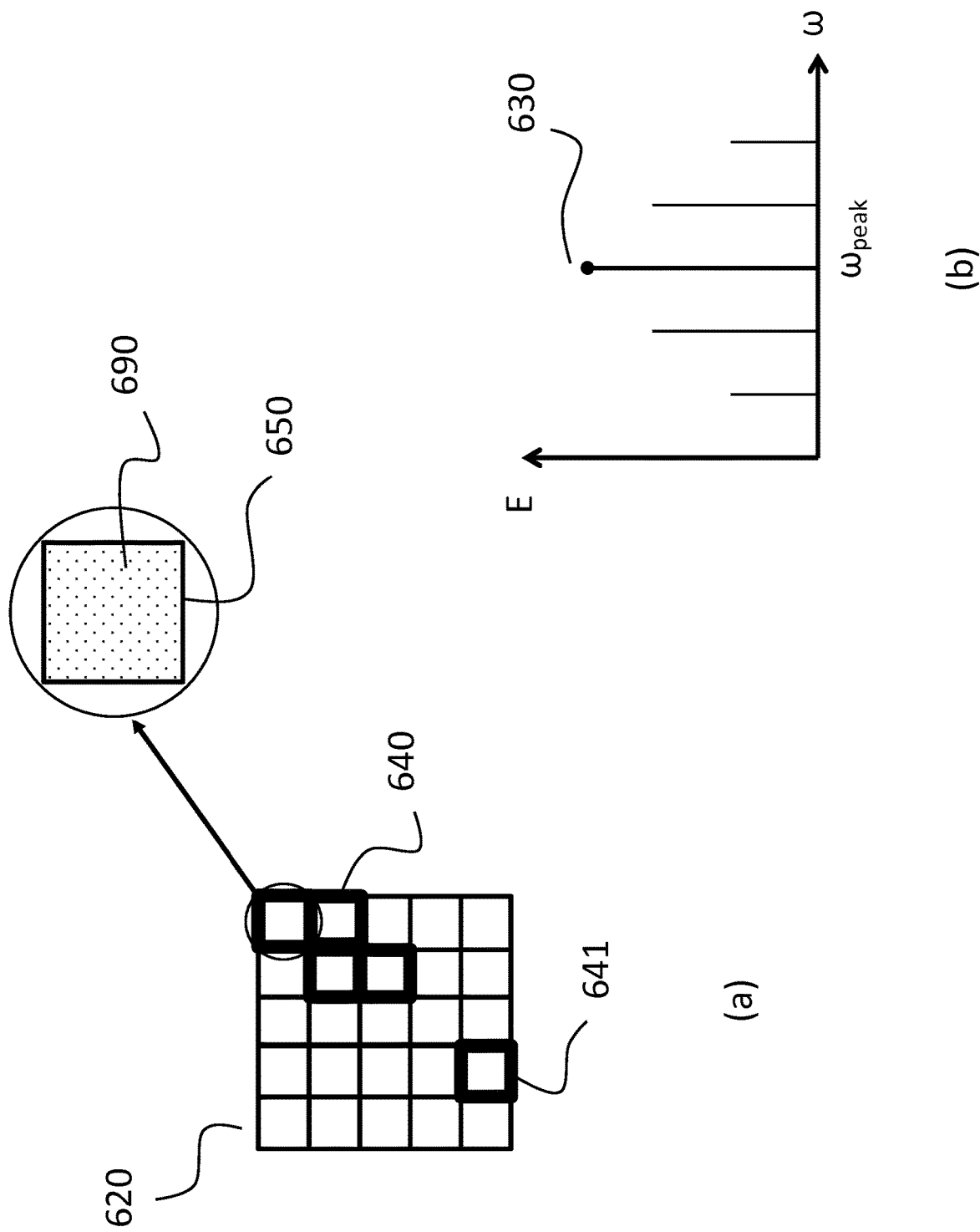
FIG. 6 shows an embodiment in accordance with the invention of (a) an image frame divided into a matrix structure, and (b) energy curve for frequencies corresponding to resolutions chosen within a matrix box of such image frame.

FIG. 6 illustrates an embodiment clarifying the aspect of spatial energy analysis onto which calibration of the detecting method is based. Consider the image frame 620 of FIG. 6 (*a*) divided into a matrix structure, and hence generating small boxes 650. A box 650 is generally built out of a multiple of pixels 690 as shown by the detailed representation. Each of the boxes 650 behaves as a kind of sensitive area, capable of measuring for instance the existing contrast for a certain resolution. In order to define such resolution, the individual dots or pixels 690 within a box 650 are considered. In general, such resolution is determined as a particular distance between the dots or pixels 690 within a box 650. For example, a first resolution R1 is the distance between two neighboring dots 690, whereas another resolution R4 can be defined as the distance between dots 690 being four dots away from each other. To continue, per box 650 a number of resolutions R1, R2 . . . Rn (where n is a natural number) are chosen, e.g. five in total, and moreover while inherent to the system each of these resolutions Ri (with i=1, 2 . . . n) correspond to a particular wavelength or frequency ωi. Hence, five frequencies ω1, ω2 . . . ω5 related to a single box 650, are arbitrarily given by the energy curve of FIG. 6 (*b*), illustrating the energy E in function of wavelength or frequency ω, and indicating the dominant frequency 630 with largest peak as being defined as the frequency corresponding to the highest energy response. This dominant frequency 630 is now chosen as the effective frequency further used for the particular box 650 for which it has been defined. Determining the dominant frequency 630 is executed for all boxes 650 within an image frame 620, or for a plurality of specific regions 640, 641, defined as a cluster or group of a certain amount of boxes 650 within this image frame 620. Not all specific regions 640, 641 are constructed out of the same amount of boxes 650, and hence different shapes and sizes of regions 640, 641 may be defined. The more contrast in the environment, the more boxes 650 chosen within an image frame 620 or specific regions 640, 641 and therefore the more sensitivity is represented. As an example, a hangar may show more contrast than for instance a tunnel in particular circumstances of light or time of the day. Subsequently, for this dominant frequency 630 per box 650 the metrics such as contrast, noise, motion and brightness can be calculated based on the greyscale measures at this dominant frequency 630. Amongst these metrics mentioned, contrast is considered the most important one, while motion and brightness (or light change) are giving additional information to the detection system. The metric noise is more an enabler as being particularly used as starting point for the calculation of contrast. It is possible that after a while, the dominant frequency 630 is no longer representative because for example the background of the image captured has changed. Therefore, the method further provides a so-called region based frequent retuning meaning that per box 650 the dominant frequency 630 may be updated due to mentioned background change. Hence, the background is stable in operation and therefore the system is very robust as compared to others in the field. The fact that this updating is performed on a per box basis, implies that only local differences, changes or disturbances need to be adapted without having the whole image to be reprogrammed. The updating of the dominant frequency 630 can be either operated automatically, or either forced by one of the so-called assisting algorithms, such as for instance the one related to motion detection. Referring for instance to the scene that a truck within the detected environment is driving away towards another location, the background of the image captured will significantly change due to the moving truck.

Figure 4:
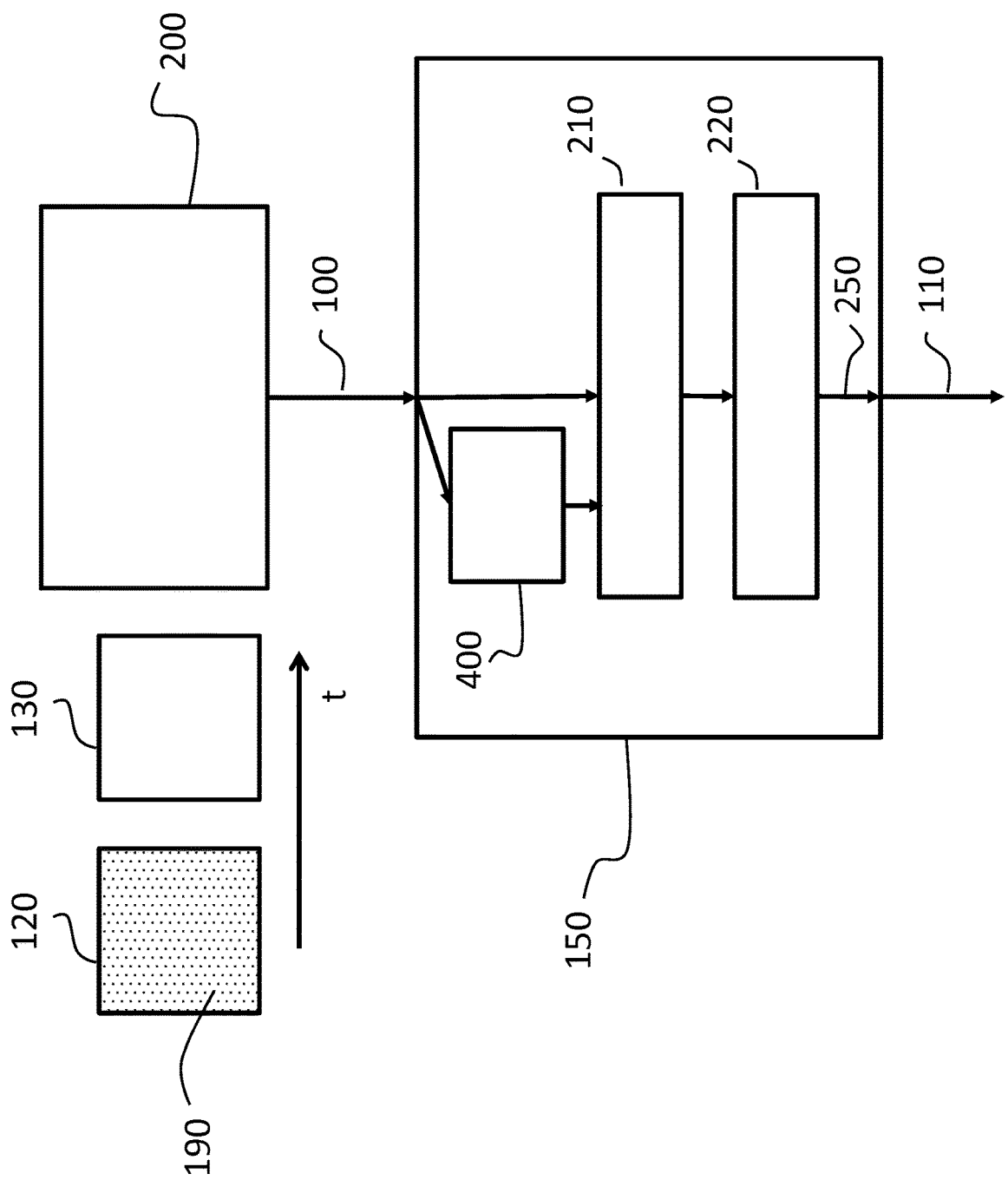
FIG. 4 provides a flowchart of a further embodiment of the method in accordance with the invention.

FIG. 4 illustrates a further embodiment of the invention. Given the purpose of the invention, i.e. smoke detection in particular, the method must be reliable. Recall that the actual smoke detection is based on a local metric computation, like for instance contrast, be it determined at various positions. In order to improve the reliability (in that a hence sensitivity tuning can be attained while avoiding too many false alarms), the observation that motion in the scene does negatively influence the method in that respect is explicitly taken into account. Indeed the method uses a step of motion detection 400. When motion is detected in a region of the image the smoke metric determined in that region is not taken into account for the further smoke detection. In an embodiment of the invention the metric value for smoke is not even calculated in that region. This is contrary to state-of-the-art methods which based on motion concludes that smoke is present. Note that contrary to the metric, which is local and hence used only a few neighboring pixels, determining of motions does require a use of a larger neighborhood. Moreover, motion is expressed over at least images distant in time while the metric value in itself is within one image frame. The same considerations as above can be made about sudden brightness changes. Hence instead of having a step of motion detection one can have a step of brightness change determination (not shown) and based thereon affected pixels can be ruled out for the smoke metric determination. In an embodiment both motion and brightness change detection are combined even. As an example, the surveillance within a waste recycling environment can be given. In waste recycling depots in particular, there is a lot of movement of material. Moreover, it concerns often heaps or piles of trash containing a lot of dust, and hence creating a smoke-like effect detected on a standard camera whenever these heaps and piles are moved from one place to another. The methods and systems according to the invention are provided with a motion detection algorithm eliminating faults or mistakes that be made between either dust or smoke being present. Light shining through roof windows of a waste recycling depot may result in (pattern) projection on the floor or within the depot environment, decreasing the contrast on a bright sunny day by means of the impression of e.g. white light spots due to overexposure.

Figure 7:
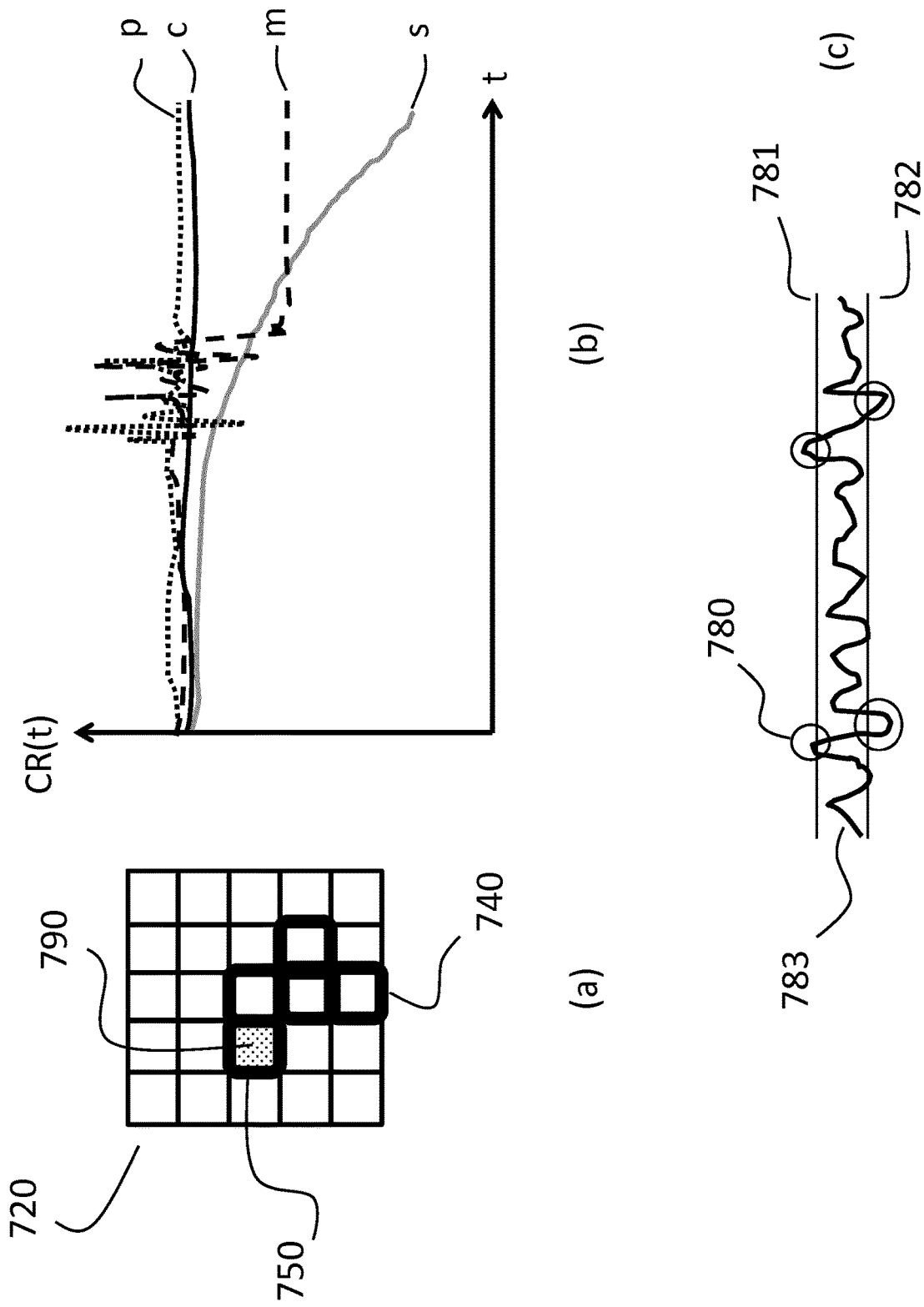
FIG. 7 shows an embodiment in accordance with the invention of (a) an image frame divided into a matrix structure, (b) possible evolutions of contrast value in time within a matrix box of such image frame, and (c) schematically represented peak identification for an outlier analysis.

The way motion and brightness change are defined will now be further explained. First, the metric motion is determined, while referring also to FIG. 7 and FIG. 8. Considering a box 750 of pixels 790 within a specific region 740 of an image frame 720 as illustrated in FIG. 7 (*a*), the contrast metric value $CR(t)$ at a particular resolution R and in function of time t can be calculated for such box 750. The definition of contrast is based on the greyscale values and temporal noise depending on the evolution of greyscale values in time. Further, the contrast value can vary from zero to a certain number in relation to a certain noise threshold. Moreover, the contrast is normalized and averaged on the contribution in contrast locally per region within an image frame 720 instead of the entire image frame 720 taken into account. In FIG. 7 (*b*) the contrast value $CR(t)$ for a given box 750 is depicted in function of time t. In case nothing really happens, or only noise is appearing in the background, the contrast $CR(t)$ remains at a certain value as indicated by the straight line c. In case smoke is present, the contrast value will be affected and hence a curved decreasing line s will represent the contrast in this occasion. If now something is moving in the environment peak disturbances will occur in the contrast line. For example, when an object is passing by in the environment without changing the background appearance after having passed, the evolution of the contrast can be illustrated by a peaked line p. When an object passing by is however changing the background scene, e.g. because the object remains at a certain location in the environment and doesn't leave when passing by, another peaked line m will schematically represent the change in contrast value, here not only temporally disturbed as shown by the peaks but also fallen down to a lower level due to the background change. Motion can thus disturb the contrast value for only a limited amount of time, and then recover again when the motion has ended, or else motion can cause a definitive change in the contrast value when an event as taken place.

Figure 8:
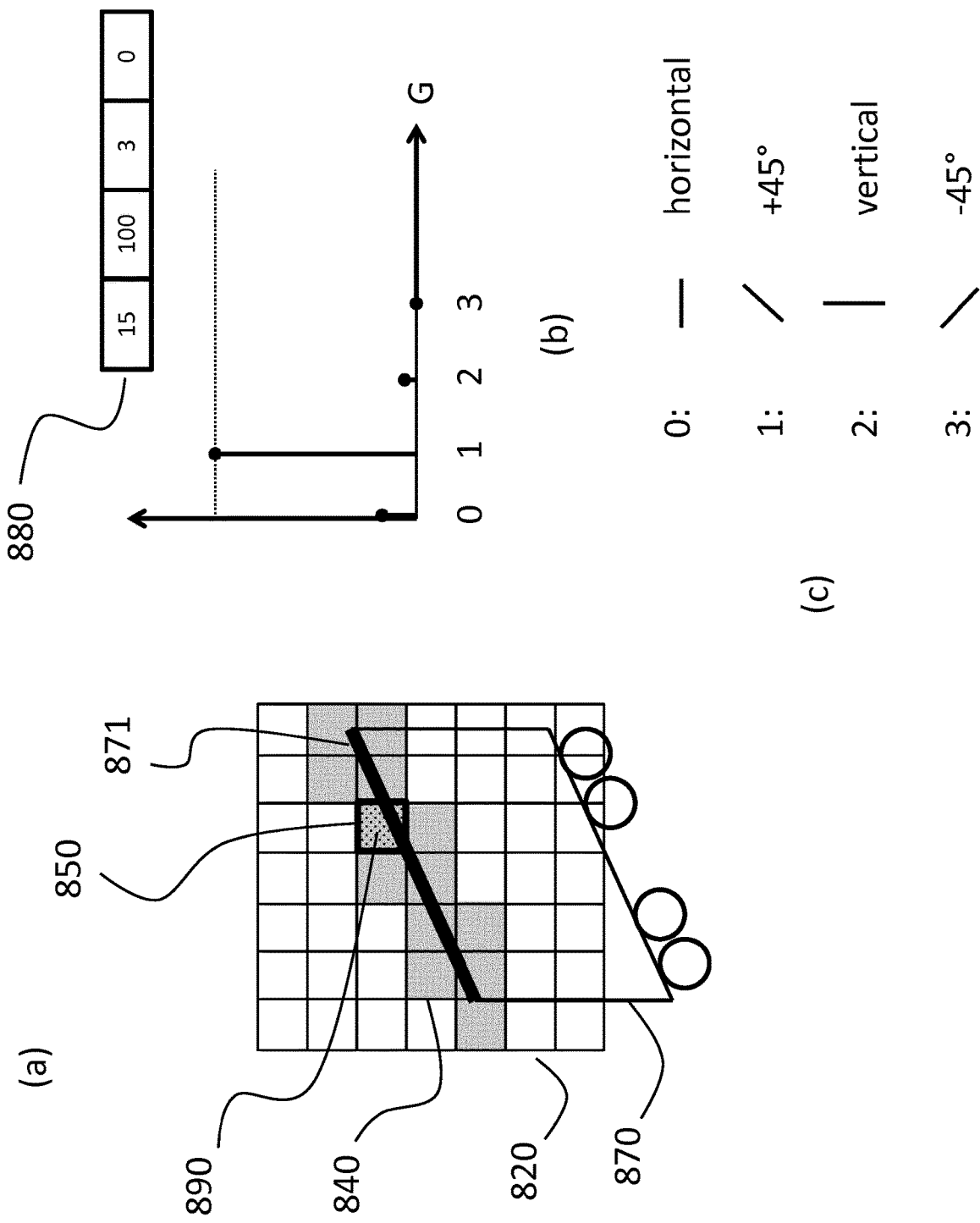
FIG. 8 shows an embodiment in accordance with the invention of (a) an image frame comprising an object with edge contrast, (b) corresponding histogram of gradients for a chosen matrix box of such image frame, and (c) corresponding gradients legend.
Figure 9:
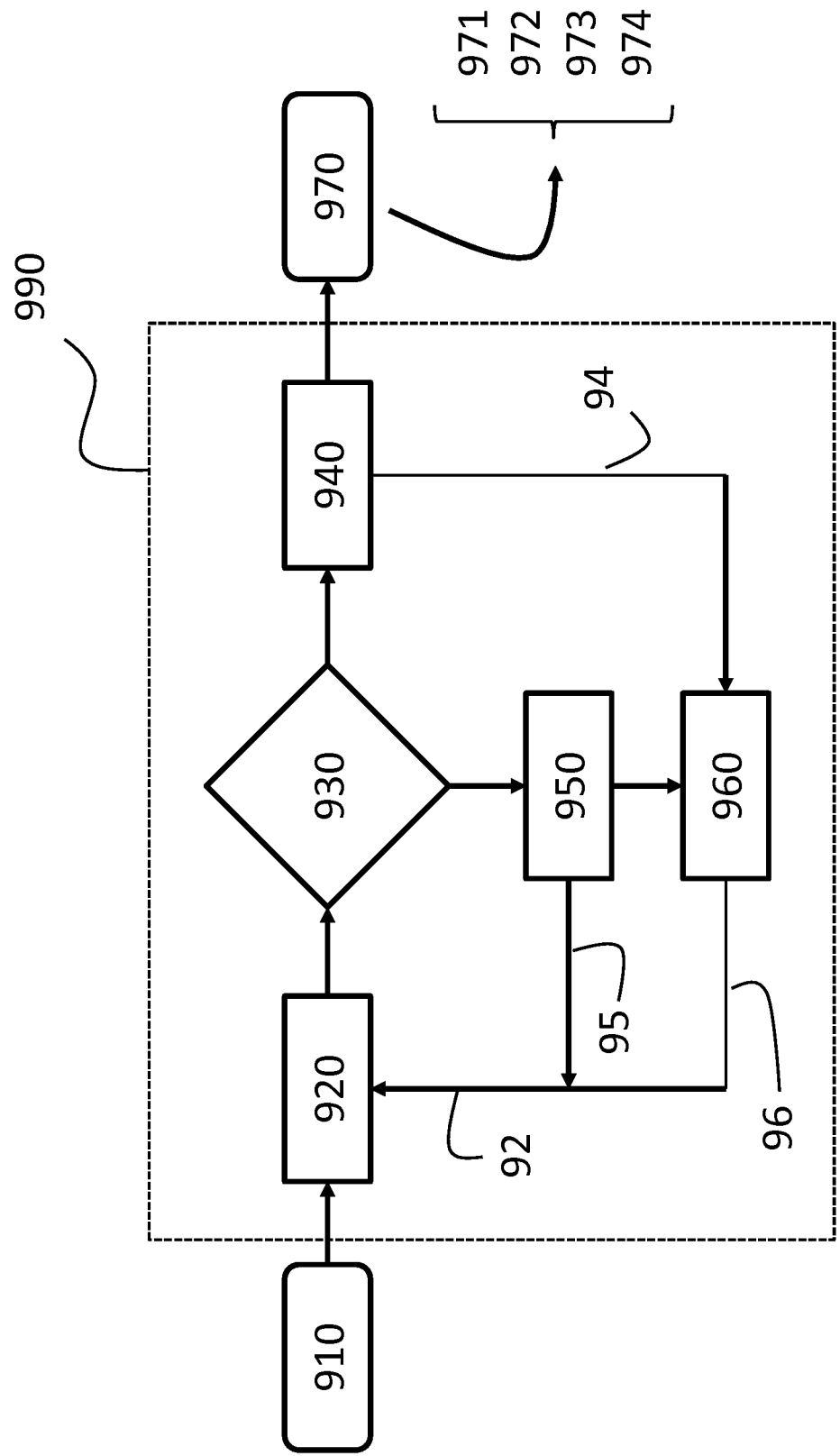
FIG. 9 illustrates schematically a flowchart of an embodiment of the main process steps for a running application comprising the detection method in accordance with the invention.

According to an embodiment of the invention, the detection method comprises an algorithm scanning the contrast evolution as mentioned above. More particularly, a metric motion is defined for such algorithm, depending on the evolution of contrast value $CR(t)$ as referred to above, on one hand, and on a distance function $D(t)$ based on so-called histogram of gradients (HOG) features in time on the other hand. Per box 750, the metric motion is hence defined by the formula $M(t)=CR(t)+D(t)$ and has the outcome value 0 or 1. In practice, the value $CR(t)$ is further elaborated based on an outlier analysis indicating appearing peaks or outliers 780 above or below a certain threshold 781, 782 in the contrast values (curve 783) over time as schematically represented in FIG. 7 (*c*). Strong disturbances indicating motion may lead to an outcome value of 1 for $CR(t)$. While referring to FIG. 8, the definition of the distance function $D(t)$ is explained into more detail. For a box 850 within the image frame 820 of a truck 870 having a roof edge 871 within a specific region 840 as shown in FIG. 8 (*a*), a histogram of gradients is given in FIG. 8 (*b*) grouping horizontal (0°), vertical (90°) and diagonal (−45° and +45°) representations of edge contrast, and herewith determining (after normalization) the corresponding HOG feature 880 for this particular box 850. Either of the directional representations is linked to a natural number increasing from 0 to 3, i.e. 0 for horizontal, 1 for +45° diagonal, 2 for vertical, and 3 for −45° diagonal, as illustrated in FIG. 8 (*c*). These climbing numbers are also indicated in the same order of appearance on the horizontal axis, hence as the gradient G, of the histogram of gradients in FIG. 8 (*b*). It is clearly seen from the HOG illustration in FIG. 8 (*b*) how the roof edge 871 of the truck 870 representing contrast in particular is oriented within the image captured, more specifically within the box 850 of the image frame 820. The corresponding HOG feature 880 is a 4-number normalized representation of the contrast (here of the roof) orientation within a given box 850. The higher one of these 4 numbers, the higher the contrast for a particular direction. As the contrast may vary in time, e.g. because the truck 870 is moving or driving away, the HOG feature 880 is also time-dependent. The distance function $D(t)$ referring to a distance in time, is determined as the temporal evolution of the HOG feature 880 for a particular box 850, and further related to a particular (noise) threshold applying outlier analysis. Large differences in time for the HOG feature indicating motion may lead to an outcome value of 1 for $D(t)$.

Although having defined now the metric motion, which is local and hence used only for a few neighboring pixels 790, 890 within a box 750, 850, as mentioned earlier, determining of real motions does require a use of a larger neighborhood. Therefore, the formula $M(t)$ is calculated for all concerning boxes 750, 850 forming a specific region 740, 840 within which a global motion of an object, for instance a driving vehicle such as a truck 870, can be detected. In an embodiment of the invention, real motion is defined when $M(t)$ equals 1 for 2% to 3% of the detected area, either per image frame, or for the combination of all specific regions within an image frame, or per specific region.

Brightness change is determined by the metric $L(t)$ for which the outcome value can be 0 or 1, and is based on a sudden significant change in brightness. The brightness itself is defined by the greyscales values. The formula L(t) is calculated for all concerning boxes 750, 850 forming a specific region 740, 840 within which an overall change in brightness can be detected. In an embodiment of the invention, real brightness change is defined when L(t) equals 1 for more than 50% of the detected area, either per image frame, or for the combination of all specific regions within an image frame, or per specific region.

In an embodiment of the invention the learning that the locality of the metric like contrast makes it rather sensitive to noise is taken explicitly into account. In essence this is done by computing a noise level and by only considering differences between pixel values above such noise level. This method wherein noise considerations are used can be applied regionally also. This method, earlier referred to as region based frequent retuning, and related to updating specs because for example the background of the image captured has changed, can also be combined with the other embodiments of the invention.

The entire process of a running application comprising the detection method in accordance with the present invention, from set-up to configuration to decision making and stating, and this in an iterative manner, will now be further described, while referring to the FIGS. 9-12. According to an embodiment of the invention, with FIG. 9 a flowchart is given of the main consecutive process steps representing also a continuous loop for the detection method. The process is initiated with a start indicator 910 followed by capturing a new image 920. After this new image captured 920 is then checked whether the system is yet configured via the decision 930. In case the answer is no, the system will first configure as illustrated with process block 950 and subsequently return via return lines 92, 95 to the new image capturing 920. When the system is configured, and the response to decision 930 is affirmative, the process will continue with process block 940 until a final state 970 is reached. According to an algorithm embodiment, such final state 970 can be FAULT 971 delivering a fault signal to the system's user or operator, OPERATIONAL 972 indicating the system is functioning normal and is in a kind of continuous and stable monitoring mode, PRE-SMOKE 973 delivering pre-smoke to the system's user or operator or SMOKE 974 delivering smoke alarm to the system's user or operator. Moreover, the state 970 may change in time since the body part of the process 990 is iteratively repeated. Via return line 94, the system will be driven to continuously perform a background update 960 and return updated specs via return lines 92, 96 to be used for a next process iteration of the loop 990. During the first run configuring the system a first background update is forced in the back.

Figure 11:
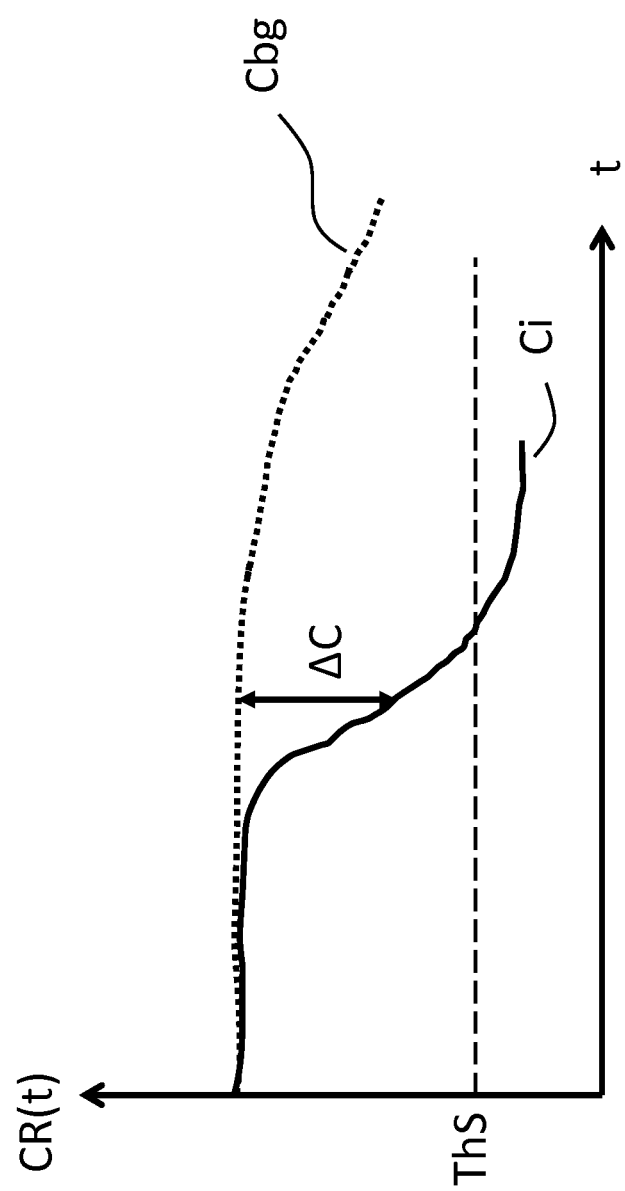
FIG. 11 shows an embodiment of the immediate contrast curve and the background contrast curve of a given image frame box in accordance with the invention.

According to an embodiment of the invention, the possible final states being FAULT, SMOKE, PRE-SMOKE or OPERATIONAL are defined as follows. The FAULT state is a direct result of having too many boxes 650, 750, 850 within the image frame 620, 720, 820 captured for which the environment is considered too dark or too bright, for which the contrast is too low, or either for which the background is not stable, and hence their state is defined as being invalid. The SMOKE state will appear whenever a significant amount of boxes 650, 750, 850 within the image frame 620, 720, 820 captured are having a contrast value below a smoke sensitivity threshold ThS, being an absolute threshold as illustrated in FIG. 11, and corresponding to a contrast value below which smoke is considered present because this value is now too close to zero. As also shown in FIG. 11, the sensitivity threshold ThS is indicated on the immediate contrast Ci curve for a particular image frame box with whom the direct comparison is made. Whenever the immediate contrast Ci has become below the sensitivity threshold ThS, the SMOKE state for the given image frame box is reached, and in case a large amount of image frame boxes arrives in that state, a SMOKE alarm will follow. The PRE-SMOKE state refers to a relative value, and is therefore a little more complex to explain. Again a significant amount of boxes 650, 750, 850 within the image frame 620, 720, 820 captured need to have reached the state of pre-smoke before PRE-SMOKE alarm will be held. Referring further to FIG. 11 the immediate contrast Ci is now compared with the corresponding background contrast Cbg of the image frame box concerned, and defined as the averaged contrast value within that image frame box over a certain period of time such as e.g. a few seconds or a few tens of seconds. Whenever the difference between the background contrast Cbg and the immediate contrast Ci defined as $\Delta C$ has become too large, the PRE-SMOKE state for the given image frame box has been reached, and in case a large amount of image frame boxes have arrived in that state, a PRE-SMOKE alarm will follow. In case none of the conditions for FAULT, SMOKE, or PRE-SMOKE state are fulfilled, the state is considered in normal OPERATIONAL state.

During the configuration 950 an image frame 620 as in FIG. 6 (a) is divided into a matrix structure, generating a number of boxes 650, each built out of a multiple of pixels 690. The boxes 650 behave as a kind of sensitive area, capable of sensing greyscale values based upon which so-called detection values, such as for example noise, contrast, brightness and motion, can be calculated for each individual box 650. Per box 650 a number of resolutions R1, R2 . . . Rn (where n is a natural number) are chosen, e.g. five in total, for which a dominant frequency—as depicted in FIG. 6 (b)—can be determined, and hence the detection values, while particularly aiming at contrast and motion, can be calculated.

Figure 10:
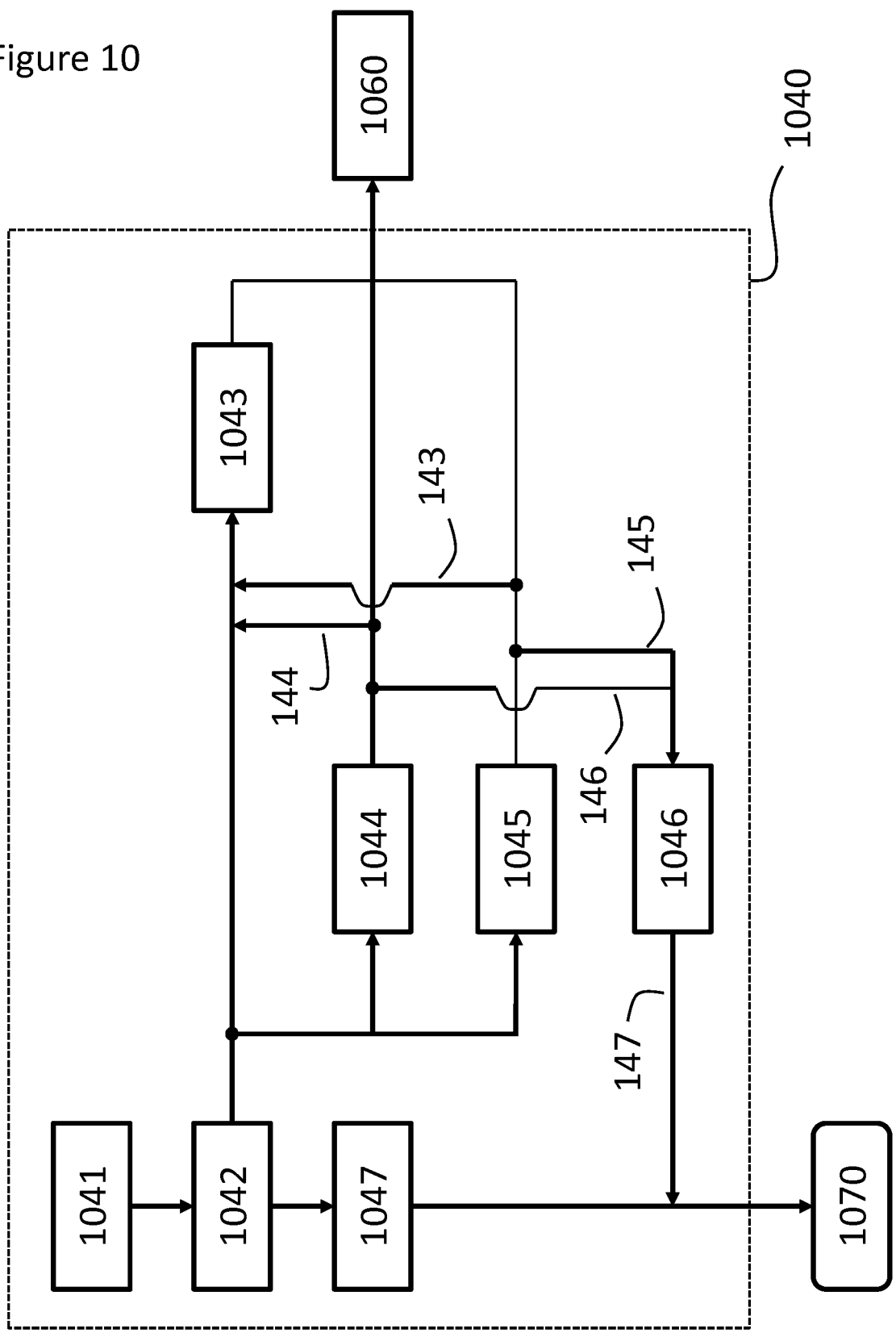
FIG. 10 provides a flowchart with more detail of an embodiment of the decision making towards decision stating process of the detection method in accordance with the invention.

The process block 940, 1040 is now described into more detail with the flowchart of FIG. 10, providing an embodiment of the decision making towards the final decision stating of the detection method in accordance with the invention. Starting from the detection values per image frame box in step 1041, these values are thereafter combined from local values to global values in block 1042, further including logic to decide upon the initial state (delivered as block 1047) of the image frame captured and having additional information gathered, which is then used to continue computations on the metrics motion and light change via their respective blocks 1044, 1045. The result of these computations may lead to an immediate background update 1060. More particularly, motion determined on a global level, all or not in combination with motion defined for a particular image frame box, all or not in combination with an appropriate parameter setting for motion (see below), may lead to activating a relearning of the image frame box, and e.g. redefine its dominant frequency as referred to earlier. On the other hand, in case of light change for instance, global light change, all or not combined with light change for a particular image frame box, all or not combined with an appropriate parameter setting for light change (see below), this may also lead to a recalculation of the image frame box values, more specifically e.g. in decreasing its sensitivity meaning that the threshold to detect smoke will be increased, and hence smoke will be detected less rapidly. If not, a background update 1060 will in any case occur after a certain amount of time $\Delta t$ as indicated by the block 1043 and the lines 143, 144. With the background specs 1060 next iteration can be returned to as described above. The computations on the metrics motion and light change resulting from the respective blocks 1044, 1045 are also further led via respective return lines 145, 146 and used to decide upon the global level final state of the image frame via block 1046. The results of this decision logic 1046 are returned by means of line 147, and hence the final state 1070 can be further transferred. It is noted that within block 1046, a particular order of processing and signaling is performed, such that in the first place it is checked whether the final state is invalid and hence a fault signal needs to be communicated to the system's user or operator. Next the smoke alarm status is checked, followed by the pre-smoke alarm, and thereafter followed by the normal operational state. This way, a logic priority in fault indication and alarm signaling is achieved.

Besides the above indicated measures (such as motion determination based and/or brightness change based assisting in the decision taking) improved reliability as defined above, can also be achieved by sharp tuning of the method parameters. With sharp tuning is meant here setting those parameters such that optimal performance is achieved. However, as such optimal setting is scene dependent (and even region dependent) and the circumstances of the scene may change (in a slow dynamic—for instance addition of elements in the scene or a change in the light during the day), tracking of the parameters, meaning changing them to an optimal setting in accordance with the present scene, is recommended and proposed in an embodiment of the invention, and more in particular an automated adjusting is provided. The method has various parameters such as the amount of pixels used in the metric determination, the noise level threshold used therewith, the threshold for deciding on a relative or absolute relevant change (or increase/decrease) of the metric (like contrast). In an embodiment of the invention the metric value in itself (in a region) is monitored and in accordance with (slow) changes thereof the parameters are adapted or tuned in relation thereto. The dashed lines in FIG. 2 illustrates this concept but can also be used in the other embodiments. Given the slow dynamics to be tracked here, the frequency of the tuning is adapted to the expected dynamics and rather in terms of various minutes up to hours or days while the overall method works on image capturing and computation rates rather in the range of minutes or even below minutes.

Figure 12:
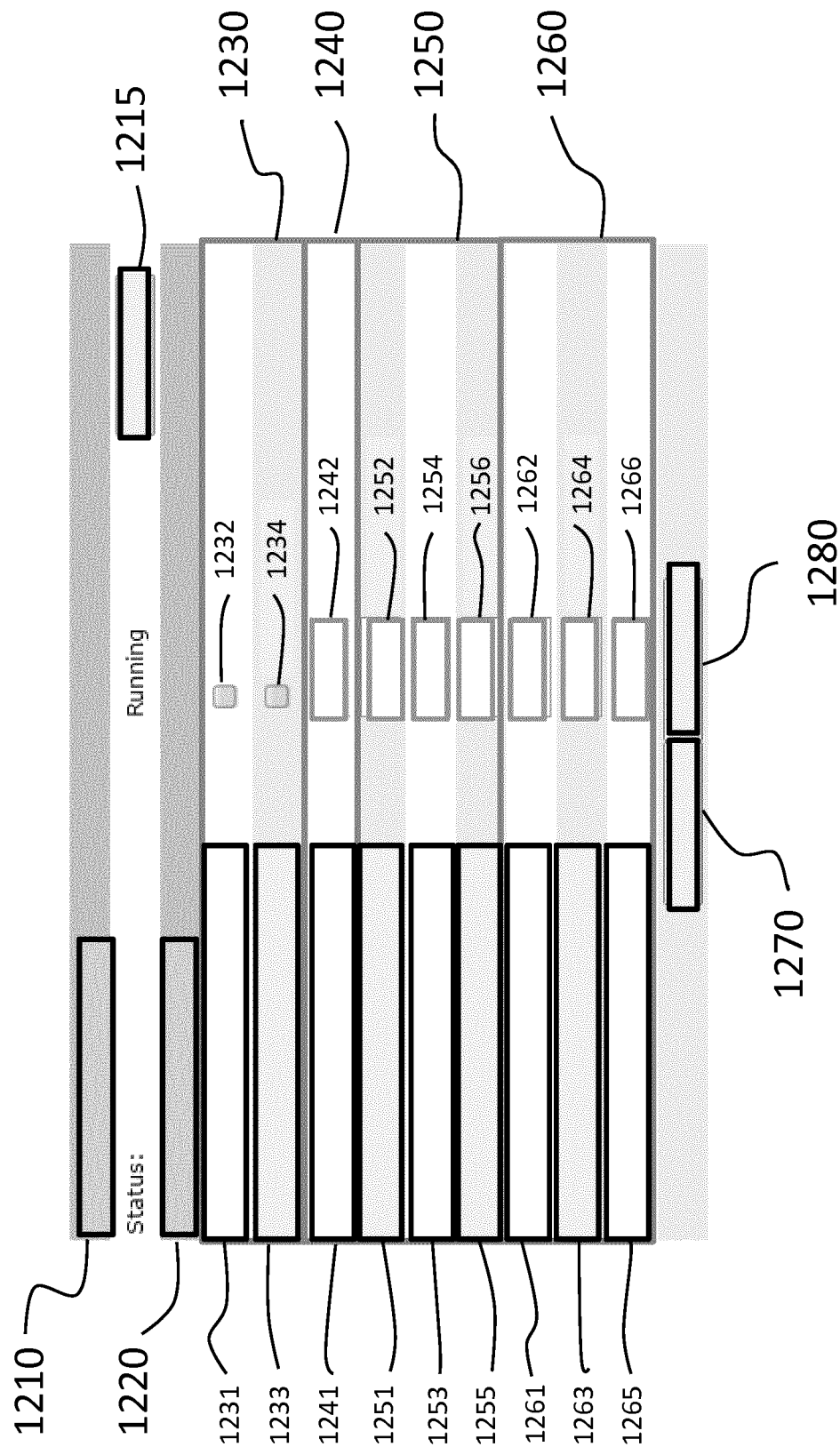
FIG. 12 illustrates an embodiment of a user interface page as part of the detection application system, wherein the parameter settings can be chosen, in accordance with the invention.

FIG. 12 illustrates an embodiment of the invention, further explaining the use of parameters with the detection method and corresponding application system, here viewed by means of a user interface page being part of such system. Along with the application settings 1210, for running or interrupting the detection application via a stop button 1215, the parameter settings 1220 can be chosen, and are categorized via four blocks 1230, 1240, 1250, 1260. A first block 1230 reflects the operating conditions, a second block 1240 reflects on the general scene the detection system will have to operate on, a third block 1250 reflects on pre-smoke alarm settings, and a fourth block 1260 reflects on smoke alarm settings. The operating conditions of the first block 1230 refer to a disrupted background 1231 and to light change compensation 1233 respectively. The disrupted background 1231 is default off representing an empty check box 1232. The check box 1232 is switched on in case of unwanted alarms caused by frequent large disturbances in the background, such as for instance motion of large objects, displacement of large objects, e.g. furniture. The light change compensation 1233 is default off representing an empty check box 1234. The check box 1234 is switched on in case of unwanted alarms caused by unstable light conditions, such as for instance artificial light switched on/off, or light variations caused by sun or shadow transitions. For the second block 1240 only one parameter can be chosen, i.e. the minimum scene detail 1241 given in percentage in corresponding field 1242, and referring to the minimum required background complexity of the scene for proper functioning of the analytics. For the pre-smoke block 1250 there are three tunable parameters. The pre-smoke alarm delay 1251 given in seconds in corresponding field 1252. If the alarm condition is continuously present for this time, a pre smoke alarm is generated. The pre-smoke alarm minimum coverage 1253 refers to the percentage in field 1254 of the scene that needs to be covered by pre-smoke before an alarm is given. The pre-smoke alarm sensitivity 1255 expressed in percentage and given in field 1256 relates to the sensitivity of the sensor for pre-smoke. For the smoke block 1260 there are again three tunable parameters. By analogy, the smoke alarm delay 1261 given in seconds in corresponding field 1262. If the alarm condition is continuously present for this time, a smoke alarm is generated. The smoke alarm minimum coverage 1263 refers to the percentage in field 1264 of the scene that needs to be covered by smoke before an alarm is given. The smoke alarm sensitivity 1265 expressed in percentage and given in field 1266 relates to the sensitivity of the sensor for smoke. By means of the lower buttons 1270, 1280 the parameter settings can be saved or reset respectively.

Figure 5:
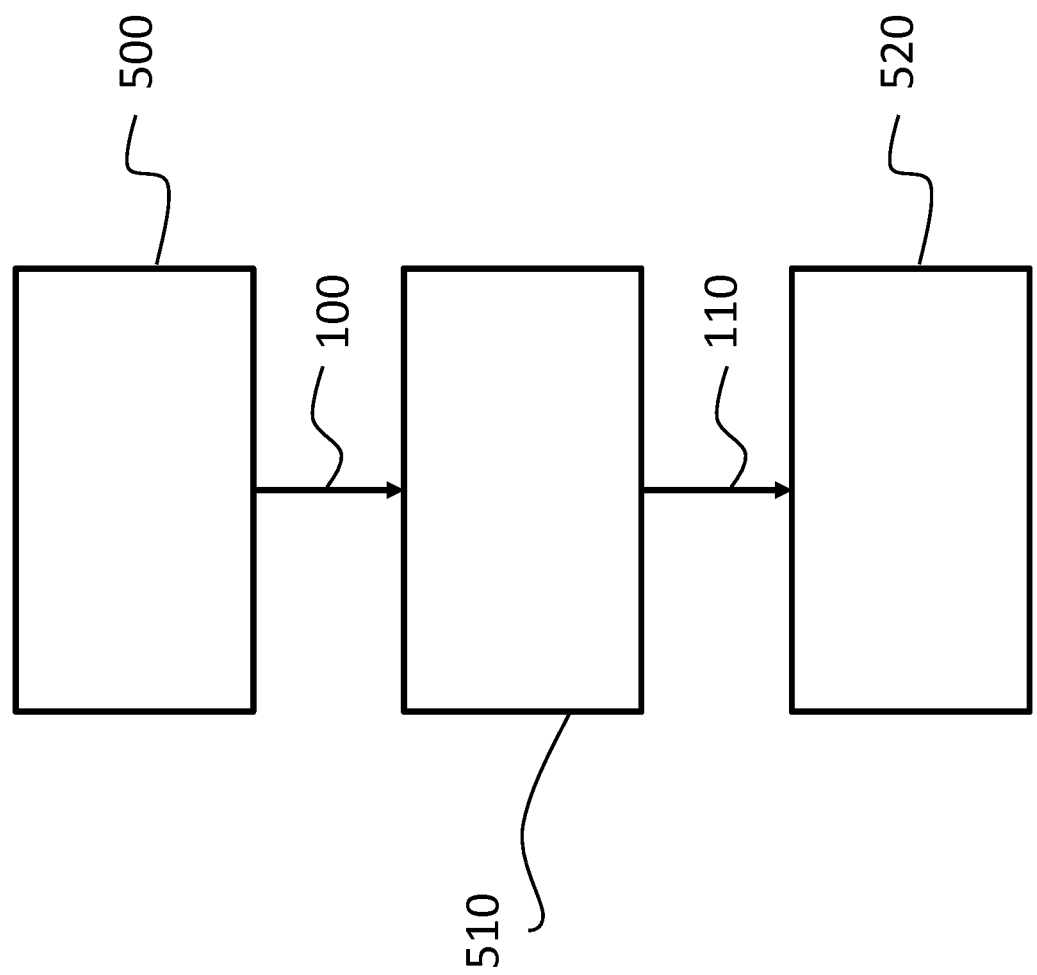
FIG. 5 illustrates schematically a system suitable for use with the invention.

As illustrated in FIG. 5, the above methods are implemented on a system, comprising a video data capturing subsystem 500 (like a camera), a computation subsystem 510 (like a computer) capable of performing any of the discussed method steps and finally a smoke warning subsystem 520 (like an alarm). These subsystems can be connected via a wired or wireless connection. The computation subsystem 510 should be selected to storage at least a plurality of image frames, a plurality of computed metrics, (regional) indicators of presence of motion or an occurrence of a brightness change, (regional) levels of noise levels and calculation means (like an ALU) for computing those metrics and indicators and supporting a control flow combining one or more of those metrics, indicators and levels to come to a smoke detection decision.

It is further noted that the invention relates to a method for detection of smoke in any environment, meaning that no particular requirements on the scene, such as for instance a predefined target image, in said environment as captured by said video data are required.

The invention claimed is:
1. A method for detection of smoke in an environment, comprising the steps of: capturing video data in said environment, comprising a plurality of image frames; computing a value of at least one metric per image frame; and determining smoke in said environment by monitoring the change in said value of said metric across said plurality of image frames,
  wherein said metric is representative for edge contrast at a portion of said image frame, and
  wherein, prior to the steps of computing a metric value and determining smoke based thereon, a step of motion detection, a step of brightness computation, or both is performed on said video data captured and based thereon said metric value for a region wherein certain motion, a certain brightness change, or both is detected is not taken into account for said smoke determining.

2. The method of claim 1, wherein prior to said computing, at least one metric for said plurality of image frames is determined in an automated manner.

3. The method of claim 2, wherein prior to the steps of capturing, computing a metric value and determining smoke based thereon, parameters for said computing a metric value are adapted to optimize sensitivity of said computed metric for changes in said environment.

4. The method of claim 3, wherein said optimization is performed on a per region basis in said plurality of image frames.

5. The method of claim 3, wherein one of said parameters being the amount of pixels being taken into account for said metric value computation.

6. The method of claim 1, wherein said value of said metric is normalized.

7. The method of claim 1, wherein the determining of smoke is based on a reduction of said value of said metric.

8. The method of claim 1, wherein in said computing of said metric value a noise level is taken into account by computing the noise level and by only considering differences between pixel values above the computed noise level.

9. A non-transitory machine-readable storage medium storing a computer program product, operable on a processing engine, for executing any of the steps of:
    capturing video data, comprising a plurality of image frames;
    computing a value of at least one metric per image frame; and
    determining smoke in said environment by monitoring the change in said value of said metric across said plurality of image frames,
    wherein said metric is representative for edge contrast at a portion of said image frame, and
    wherein, prior to the steps of computing a metric value and determining smoke based thereon, a step of motion detection, a step of brightness computation, or both is performed on said video data captured and based thereon said metric value for a region wherein certain motion, a certain brightness change, or both is detected is not taken into account for said smoke determining.

10. A smoke detection system, comprising:
    a subsystem for video data capturing;
    a computation subsystem, adapted for storage of said video data captured and for executing of any of the steps of:
        capturing video data, comprising a plurality of image frames;
        computing a value of at least one metric per image frame; and
        determining smoke in said environment by monitoring the change in said value of said metric across said plurality of image frames,
        wherein said metric is representative for edge contrast at a portion of said image frame, and
        wherein, prior to the steps of computing a metric value and determining smoke based thereon, a step of motion detection, a step of brightness computation, or both is performed on said video data captured and based thereon said metric value for a region wherein certain motion, a certain brightness change, or both is detected is not taken into account for said smoke determining; and
    a smoke warning subsystem, being capable of being activated by said computation subsystem.

* * * * *